Oct. 20, 1964  F. A. BLANK ETAL  3,153,517
MOTION PICTURE FILM HANDLING SYSTEM
Filed Dec. 28, 1961  2 Sheets-Sheet 2
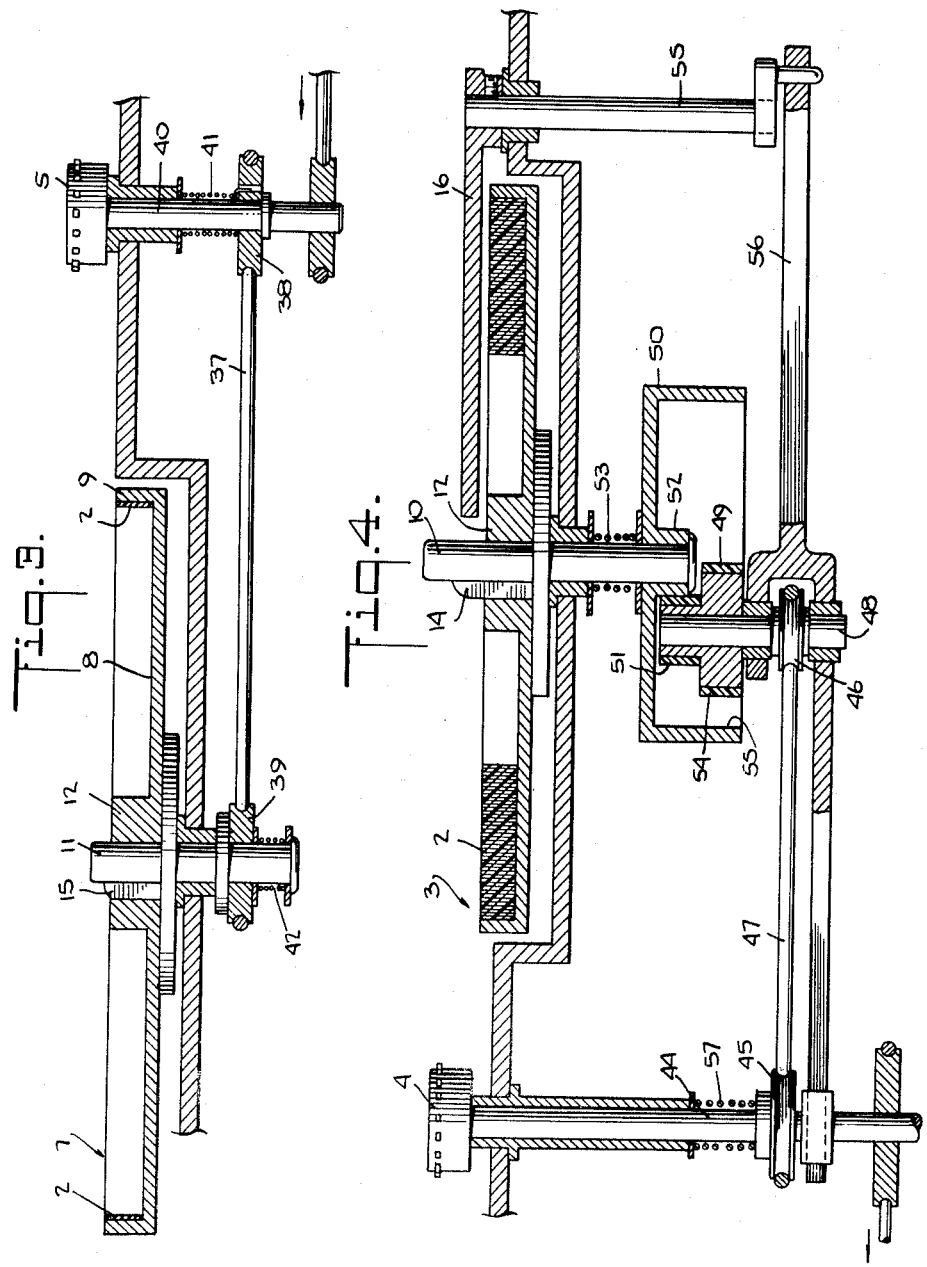
INVENTORS
Fritz A. Blank
Norman Buten
BY
Norman H. Held
ATTORNEY

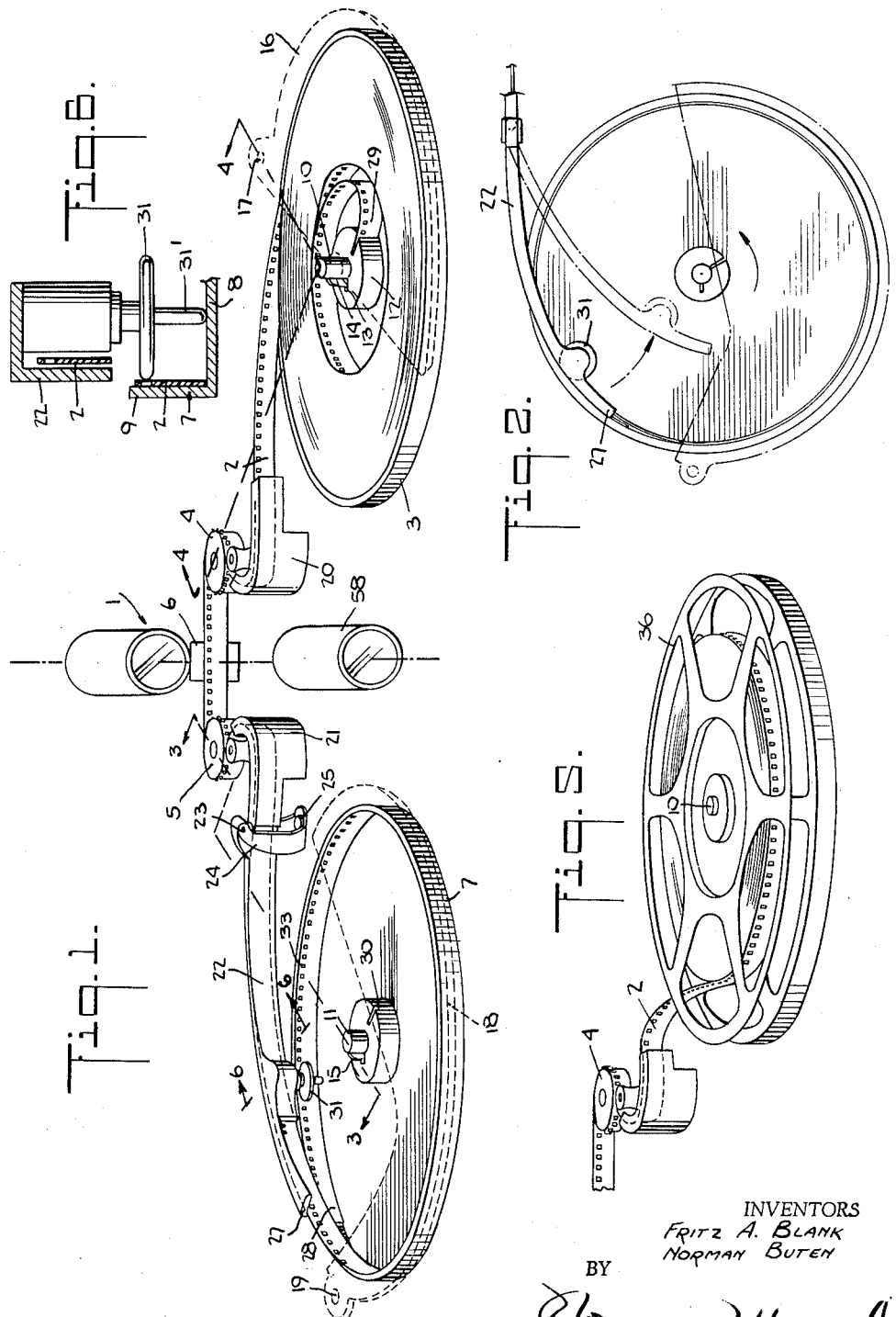

United States Patent Office 3,153,517
Patented Oct. 20, 1964

3,153,517
MOTION PICTURE FILM HANDLING SYSTEM
Fritz A. Blank, New Rochelle, and Norman Buten, Brooklyn, N.Y., assignors, by mesne assignments, to Airequipt Inc., New Rochelle, N.Y., a corporation of New York
Filed Dec. 28, 1961, Ser. No. 162,781
2 Claims. (Cl. 242—55.21)

The present invention relates to a film handling system for motion picture projectors and more particularly to such a system which eliminates the necessity for rewinding the film after projection.

Present motion picture projectors have film handling systems wherein the film passes from such a supply reel to a take-up reel during projection in such a way that the film must be rewound onto the supply reel before it may be again exhibited. This rewinding of the film requires an additional step and a corresponding inconvenience, film wear, and time loss. Various means to eliminate rewinding by causing the film to be wound from the outside to the inside of the take-up reel have been proposed. These proposed systems in each case have required relatively complex film handling mechanisms and reels and for this reason have never been found suitable for use with either commercial or home types of motion picture projectors.

Our new system provides a relatively simple and easily operated means for eliminating rewinding and also includes an automatic method for inserting the film into the take-up receptacle which eliminates the conventional step of attaching the film to the take-up reel. The system also is adapted for interchangeable use with conventional film reels which may be used in the normal way. The system is also particularly convenient in that it is readily adaptable to the various self-threading systems which automatically pass the film around the projector film feeding sprockets and through the projection gate mechanism so that an automatic, self-loading, no-rewind projector results.

Accordingly, an object of the present invention is to provide an improved film handling means for motion picture projectors.

Another object of the present invention is to provide an improved film handling means for motion picture projectors which eliminates film rewinding after projection.

Another object of the present invention is to provide a film handling system which facilitates completely automatic film loading.

Another object of the present invention is to provide a film handling system adaptable for use with both standard reels and with no re-wind receptacles.

Another object of the present invention is to provide a no-rewind film handling system with a relatively simple drive.

Another object of the present invention is to provide a no-rewind film handling system wherein the film receptacles or reels comprise storage containers.

Another object of the present invention is to provide a film handling system characterized by a gentle film manipulation which minimizes film wear.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of a preferred embodiment of the film handling means in accordance with the present invention;

FIG. 2 is a top plan view of a take-up receptacle;

FIG. 3 is a sectional view of the take-up receptacle and the related feeder arm and drive taken along line 3—3 of FIG. 1;

FIG. 4 is a sectional view of the supply receptacle and the related drive taken along line 4—4 of FIG. 1;

FIG. 5 is a fragmentary perspective view illustrating a conventional reel in position on the supply receptacle mounting; and FIG. 6 is a sectional view of feeder arm taken along line 6—6 of FIG. 1.

The film handling system will first be described with particular reference to FIG. 1 in connection with the normal operation of the system in feeding a film through a projector indicated generally at 1. The film 2 passes from a receptacle 3 past drive sprockets 4 and 5 and through a shutter indicated generally at 6 to a take-up receptacle 7. As will be clear from the following description, the receptacles 3 and 7 are identical and as shown in FIG. 1, the film 2 is withdrawn from the outer edge of the supply reel 3 towards the center while at the take-up receptacle 7, the film is fed so that it winds from the outer edge inwardly towards the center. At the completion of the run it is only necessary to interchange receptacles 3 and 7 to rerun the film so that the normal film rewinding step is eliminated.

Each of the receptacles 3 and 7 comprises an open can-like container having a bottom 8 and a flange 9 (FIG. 3) to contain the film. The receptacles are mounted on the supply or the take-up spindles 10 and 11 by hub 12 having a slot 13 adapted to engage the keys 14 or 15 on the spindles 10 and 11. A cover 16 is pivotally attached to the projector frame at 17 to partially enclose the supply receptacle 3 after it has been placed on the projector and a cover 18 is similarly mounted on a pivot 19 to partially cover the take-up receptacle 7 mounted on the take-up spindle 11. When a receptacle 3 is fitted over the supply spindle 10, the film 2 is threaded over the drive sprocket 4, through the shutter system 6 and over drive sprocket 5 in the usual way which may be automatically done by using curved guide members 20 and 21 which assist in the threading but which form no part of the present invention. The film 2 after being engaged with the drive sprocket 5 is directed into the hollow and pivotally mounted feeder arm 22 which directs the film 2 into the take-up receptacle 7 mounted on the take-up spindle 11. The feeder arm 22 is an important element of our film handling system and its preferred form and operation will now be described with particular reference to FIGS. 1, 2 and 6.

The arm 22 comprises an arcuate, hollow member pivotally attached for swinging motion about an axis parallel to the plane of the receptacle 7 by pin 23 and pivotally mounted for swinging motion about an axis perpendicular to the plane of the receptacle 7 by a swivel 24 pivotally connected at 25 to the projector frame. As seen in FIG. 2, the arm 22 has an arcuate shape less sharply curved than the normal curl of the film in the receptacles 3 and 7. As the film leaves the feeder arm 22, the feeder arm 22 directs the film toward the inner edge of the receptacle flange 9 and the natural curl or set of the film causes the film to seek the inner edge of the flange 9. The curvature of the feeder arm 22 forms a restrictive arc in the film 2 passing through it which imparts longitudinal stiffness to the film for directing the film into the take-up receptacle 7 i.e. a strip of film formed as a cylinder or as an arcuate portion of a cylinder will support an axial force better than a straight strip. The bottom of the receptacle 7 and the curved strip of film 2 entering the receptacle have this relation. At the same time this arcuate restriction provides a force on the feeder arm 22 swinging it radially outwardly of the receptacle 7.

Advancement of the film 2 by the drive sprockets 4 and 5 through arm 22 causes the film to slide along the flange 9 until a short length makes frictional engagement with the flange 9. The receptacle 7 is then turned by the film and begins to rotate at a speed governed by the speed of the film. While operating in this normal projection mode, neither the supply spindle 10 nor the take-up spindle 11 are driven and both spindles are left free to rotate under the control of the connected receptacles 3 and 7. Receptacle 3 is rotated by the film 2 as it is withdrawn by the drive sprocket 4 and the receptacle 7 is rotated by the above described entry of the film 2 into the receptacle 7. The above action will continue until the film 2 has been completely withdrawn from the supply receptacle 3 and has had its inner end 29 carried past the drive sprocket 5. The action is completed by the operator turning the take-up receptacle 7 far enough to draw the film 2 out of the feeder arm 22 so that the film end 29 may be slipped into receptacle slot 30. It is clear from the above description that this normal projection sequence may now be repeated by interchanging receptacles 3 and 7 and by repeating the above steps.

A follower roller 31 is rotatably mounted on pin 31' on the feeder arm 22 and is vertically positioned by the sliding contact of pin 31' on the bottom of receptacle 8. The roller 31 presses against the sprocket portion 33 of the film 2 as a result of the above described outwardly directed radial force on the arm 22 resulting from the passage of the curved film through arm 22.

Roller 31 is positioned so that film 2 is spaced from the previously fed coil as it emerges from the end 27 of arm 22 causing the film to engage the receptacle bottom 8 prior to moving outwardly against the previously fed coil of the film. Relative lateral or sliding movement between adjacent coils of the film is thereby minimized so that the film 2 feeds into the take-up receptacle 7 with a minimum amount of relative movement between the entering film and the previously fed coils.

While no positive drive system is used for the spindles 10 and 11 during the normal forward projection, a drive system is provided, as will now be described, to permit reverse operation of the above described system and also to permit this film handling system to be used in the normal way with conventional reels such as the reel 36 illustrated in FIG. 5.

When it is desired to reverse the film such as, for example, to reverse the motion during exhibition, both the supply spindle 10 and the take-up spindle 11 are driven. The take-up spindle 11 is driven to cause the film to be withdrawn from the inner edge of the film coil without being pulled sharply across the receptacle 7 and against the hub 12. A preferred form of this drive comprises a belt 37 coupling, pulleys 38 and 39 on the drive sprocket 5 and the take-up spindle 11 respectively. The pulley 38 is coupled to the shaft 40 of the drive sprocket 5 by a unidirectional coupling 41. The pulley 38 thus is inoperative in normal forward operation but rotates when the sprocket 5 is reversed to reverse the film 2. The pulleys 38 and 39 are proportioned to provide an over drive of the receptacle 7 with relation to the reverse film speed and in order to compensate for the over drive, the pulley 39 is connected to the spindle 11 by a slip clutch 42.

A preferred embodiment of the drive for the supply reel 3 is illustrated in FIG. 4. It is powered from the shaft 44 of the drive sprocket 4 during reverse rotation of the shaft 44 only through the intermediation of pulleys 45 and 46, belt 47 and uni-directional drive means 57. The pulley 46 is mounted on an intermediate drive shaft 48 having a drive wheel 49 on its upper end which engages and rotates the spindle 10 through drive wheel 50. In normal reverse operation, the upper resilient drive surface 51 of the drive wheel 49 engages the inner hub 52 of the wheel 50 providing a clockwise rotation of the spindle 10 (FIG. 1) so that the film 2 is drawn into the receptacle 3. The above described drive system for spindle 10 is driven at a greater speed than that required to return the film to the receptacle 3 and a suitable over drive clutch is provided as illustrated at 53.

As noted above, this film handling system may be used with a conventional supply reel. When this is done, the reel 36 is mounted over the upper portion of the spindle 10 as illustrated in FIG. 5 and the film 2 is then fed into the system in the same manner as described above for regular forward projection. The system operates in the above described manner except that the film is withdrawn from the reel 36 in the opposite direction as shown in FIG. 5. The film 2 may now be left in the receptacle 7 for use in the no-rewind system or it may be rewound on the spool 36 if desired.

In order to rewind the film on reel 36, reel 36 must be driven in the opposite direction from the receptacle 3 during the rewind operation. This is provided for by the automatic reversing system illustrated in FIG. 4. This system is automatically controlled by the cover 16 for the receptacle 3. When a spool 36 is positioned above the receptacle 3 on spindle 10, the cover 16 is swung clear of the receptacle 3. This swinging motion of the cover 16 moves the drive wheel 49 to its outer position with its lower resilient drive surface 54 engaging the flange 55 of the drive wheel 50 thus causing the spindle 10 to rotate in a counterclockwise direction (FIG. 1). The cover 16 is coupled to the shaft 48 through the intermediation of crank 55 and slidably mounted connecting arm 56 which mounts the shaft 48.

As seen from the above description, the film handling system may be used with the receptacles as a no-rewind system and the receptacles may be conveniently used as storage cans with the addition of a suitable cover. The system also may be used with regular movie projector reels and in this case, the film may be left in the take-up receptacle for future use in the no-rewind manner as described for future use in the no-rewind manner as described above or the film may be reversed and rewound on the regulator type of reel for use on conventional projectors.

The preferred embodiment described above has the supply and take-up receptacles positioned in a generally horizontal plane since this orientation facilitates the handling of the receptacles both by minimizing the reliance on the covers and also by providing a more convenient layout for the manipulation of the receptacles or the reels by the operator. When thus used, the lens element 58 is provided with a suitable optical device for rotating the projected image the necessary amount so that it is displayed upright on the screen.

It is clear, however, that the receptacles and the related film track may also be arranged in a generally vertical plane where covers such as covers 16 and 18 are used to retain the coils of film within the receptacles. Any desired arrangement of the receptacles and the film path between a horizontal arrangement and a vertical arrangement may be used as desired.

It will be seen that a new film handling system has been provided for a no-rewind movie projector. The system thus provided is relatively simple and reliable in operation and is typified by minimum film handling. This minimum handling of the film and the elimination of the rewinding step reduces wear and extends the useful life of the film while at the same time simplifying the projecting operation and speeding up the film changing.

The no-rewind system also has a relatively simple drive system in which no drive is required for the receptacles during the normal forward projection and in which a simple over drive only is required during reverse operation. The film receptacles used in the system for handling the film during projection are can-like receptacles which also may be used for film storage with the addition of a simple cover member.

The no-rewind system is also well adapted for use with the known types of automatic threading means which automatically engage the film with the projector drive sprockets and shutter means. When thus combined with such a self-threading system, a completely automatic film handling system is obtained wherein the operator need only mount the film receptacles on their mounting spindles and insert the end of the film from the supply reel into the self-threading slot. After this is done, the projector is run at its regular forward speed and the film passes through the self-threading means and into the take-up reel without further manipulation by the operator. The film may then be completely exhibited and may then be re-exhibited by simply interchanging the supply and the take-up receptacles.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A film handling system for a motion picture projector having a film drive sprocket comprising the combination of spaced rotatably mounted spindles, a unidirectional drive coupled to one of said spindles, a reversible drive coupled to the other of said spindles, shallow open ended cylindrical receptacles for receiving and storing film in spiral form on each of said spindles, an elongated curved film feeding arm, a pivotal mounting adjacent one end of said arm adjacent to one of said spindles, said arm being curved with its concave side facing said one spindle, said arm having a passage for film extending between its opposite ends and positioned to receive film at said one end from said drive sprocket, and a follower means mounted on said arm and positioned to engage film in a receptacle on said one spindle and to space the free end of said arm inwardly of the innermost spiral of film within said last named receptacle.

2. The film handling system as claimed in claim 1 which further comprises a pivotally mounted cover positioned adjacent each of said spindles to removably cover at least a portion of each of the receptacles on said spindles, and a coupling between the cover adjacent said other spindle and said reversible drive for activating it when the cover is swung on its pivot.

References Cited in the file of this patent

UNITED STATES PATENTS

| | | |
|---|---|---|
| 1,119,489 | Bingham | Dec. 1, 1914 |
| 1,950,601 | Droll | Mar. 13, 1934 |
| 2,085,439 | Morlock | June 29, 1937 |
| 2,481,708 | Adams | Sept. 13, 1949 |
| 2,495,344 | Proch | Jan. 24, 1950 |
| 2,607,545 | McNabb | Aug. 19, 1952 |
| 2,892,899 | Connell | June 30, 1959 |
| 3,002,061 | Perkins | Sept. 26, 1961 |
| 3,063,651 | Becker et al. | Nov. 13, 1962 |